United States Patent [19]

McCulloch et al.

[11] Patent Number: 4,951,804
[45] Date of Patent: Aug. 28, 1990

[54] CONVEYOR FOR TURNING CONVEYED PARTS

[75] Inventors: Charles E. McCulloch, Ferndale; Michael Peabody, Bloomfield Hills, both of Mich.

[73] Assignee: Durr Automation, Inc., Davisburg, Mich.

[21] Appl. No.: 353,078

[22] Filed: May 17, 1989

[51] Int. Cl.⁵ .......................................... B65G 47/26
[52] U.S. Cl. ................................. 198/457; 198/774.1
[58] Field of Search ............... 198/774, 778, 457, 576, 198/614

[56] References Cited

U.S. PATENT DOCUMENTS

| | | | |
|---|---|---|---|
| 4,042,104 | 8/1977 | Furlette et al. | 198/774 |
| 4,496,042 | 1/1985 | Rise | 198/774 |
| 4,687,092 | 8/1987 | Ray | 198/774 X |
| 4,714,153 | 12/1987 | Bischofberger et al. | 198/774 X |
| 4,838,411 | 6/1989 | Rainey et al. | 198/774 |

Primary Examiner—David A. Bucci
Assistant Examiner—Cheryl L. Gastineau
Attorney, Agent, or Firm—Dykema Gossett

[57] ABSTRACT

A conveyor for turning conveyed parts is disclosed that operates on a lift and carry type principle. A first straight lift and carry section delivers parts to a first point. A corner or turn lift and carry section lifts these parts and turns them through a desired angle to connect the part into a second straight lift and carry section. A transmission is disclosed for interconnecting the second lift and carry section to drive the corner lift and carry section. This transmission ensures proper timing between the two. The improved lift and carry conveyor will ensure that parts are turned through an angle while remaining separated by an adequate distance.

9 Claims, 4 Drawing Sheets

CONVEYOR FOR TURNING CONVEYED PARTS

BACKGROUND OF THE INVENTION

This invention in general relates to a conveyor that will turn conveyed parts about a pivot axis, and more particularly, this invention discloses a lift and carry, or walking beam conveyor that will turn a conveyed part through a predetermined angle from a first upstream lift and carry conveyor section to a second downstream lift and carry conveyor section.

Lift and carry, or walking beam conveyors are well known in industry. Generally, this type of conveyor has a frame section upon which parts rest. A lift member is disposed vertically below and within this frame section and is periodically lifted vertically upwardly out of the frame section to lift the parts that are resting upon the frame section upwardly with it. A second drive member then drives the lift member in a direction along the conveyor path. Once the parts have been moved along the path to a certain extent, the lift member is brought vertically back downwardly within the frame member, and the parts are again rested on the frame member. By repeating these movements, and by having a series of these conveyors along a desired path, parts are moved along the desired path.

In modern conveyor environments, it is usually necessary to turn conveyed parts through a predetermined angle at certain points along the conveyor path. This may be necessary due to the location of two subsequential manufacturing steps for the parts. That is, there may be an angle between the output of a first manufacturing step and the input of the subsequent manufacturing step. When it is necessary to turn the conveyed parts about an angle, the prior art lift and carry conveyor are often inadequate. Other types of devices have been utilized to turn parts through an angle from a first lift and carry conveyor section to a second lift and carry conveyor section.

Turning mechanisms have been utilized that are mounted above the lift and carry conveyors and will reach downwardly, pick up the parts and turn them through the predetermined angle. These types of mechanisms are generally complex and expensive.

Lift and carry type conveyors are especially beneficial since each conveyor section will lift and carry a part an incremental distance and will keep the various parts separated by a set distance. In a device that will pick up the parts and turn them, such as mentioned above, it is much more difficult to keep the parts separated.

It is an object of the present invention to disclose a conveyor mechanism having a corner or turn section that will turn parts through a predetermined angle from one lift and carry conveyor section to a second lift and carry conveyor section.

Further, it is an object of the present invention to have such a corner section that is also a lift and carry conveyor section.

Further, it is an object of the present invention to have this corner lift and carry conveyor section be driven by the drive of one of the two lift and carry conveyor sections that it is connecting.

Moreover, it is an object of the present invention to disclose such a device that is relatively inexpensive to manufacture and formed of relatively few moving parts.

SUMMARY OF THE INVENTION

A preferred embodiment of the present invention discloses a lift and carry conveyor assembly that has a first straight upstream lift and carry section that delivers parts to a first point, a corner lift and carry conveyor section that turns the parts from the first point through a predetermined angle to a second point and a second straight downstream lift and carry conveyor section that will move the parts from this second point further on along a conveyor path.

The first straight lift and carry conveyor section extends along a first axis and has a frame fixed to a base. A lift and carry bar is received in the frame and periodically is lifted vertically above and out of the frame and driven, at a vertical position above the frame, in a first direction along the first axis. Parts rest on the frame and are lifted by the lift and carry bar vertically above the frame and moved along with the bar to a new position along the first axis. In this way, the first straight line lift and carry type conveyor moves parts along the axis, or conveyor path.

A second straight lift and carry section is also utilized in this system and conveys parts in the same way that the first straight lift and carry section does. The two straight lift and carry conveyor sections extend along axes that are skew with respect to each other.

The corner lift and carry section is disposed between the two straight lift and carry sections and also consists of a frame portion fixed to a base and a lift and carry bar. The corner lift and carry bar is shaped into an arc and is constrained to pivot about an axis. The corner lift and carry bar is also received in the frame and is also periodically lifted vertically above and out of the frame and is driven to pivot about the pivot axis.

In a most preferred embodiment of the present invention, the corner lift and carry bar is connected to be driven to pivot by the downstream lift and carry bar. The connection between the downstream straight lift and carry bar and the corner lift and carry bar is such that the two parts can move relative to each other in vertical, horizontal and rotational directions.

The two straight lift and carry sections each have drive mechanisms that consist of an eccentric mounted upon a rotating shaft. A roller cam is in contact with the eccentric and is connected through a two-cam link to the lift and carry bar of the lift and carry section. A bell crank is also attached to the rotating shaft and periodically engages the lift and carry bar to move it vertically upwardly. In this way, the bell crank first moves the lift member vertically upwardly to engage and lift the lift and carry bar. The eccentric then causes the two-bar cam link to move the lift and carry member along the conveyor axis or path. Once the lift and carry member has moved along this path to the desired extent, the bell crank and eccentric will allow the lift and carry bar to move vertically back downwardly, and the lift and carry bar is brought back within the frame.

A shaft extension extends from the shaft of the downstream straight lift and carry section and is slightly eccentric with respect to the shaft. A rocker arm is mounted upon this shaft extension and is allowed to rotate with respect to the shaft extension. The eccentricity of the shaft extension causes the rocker arm to rock about an arc.

At one end of the rocker arm, a turnbuckle is pinned which is in turn pinned to a slide mechanism. The slide mechanism is pinned to a second turnbuckle which is in turn pinned to a lift post. The lift post is rotationally received within a post mount which is fixed to the frame of the corner lift and carry section. A pivot bracket is received on the lift post and may rotate with respect to the lift post. The pivot bracket is fixed to the corner lift and carry bar and guides the corner lift and carry bar about a pivot axis while it is being driven by the downstream straight lift and carry bar.

As the rocker arm moves in a first direction, it pulls the first turnbuckle and the associated slide along with it. The slide pulls vertically downwardly on the second turnbuckle which causes the lift post to be brought to a vertically lower position. When the rocker arm is returned in the opposed direction, it forces the first turnbuckle in the same direction, and the slide moves along with it. The second turnbuckle is then moved vertically upwardly, and it pushes the associated lift post upwardly. The pivot bracket is received on the lift post and is also moved upwardly, causing the corner lift and carry bar to be moved upwardly along therewith.

By this mechanism, the corner lift and carry member is periodically lifted in response to the position of the downstream lift and carry member.

Each of the two turnbuckles can be adjusted to adjust the length of the interconnection of the rocker arm, the slide, and the lift post to thereby control the frequency and extent of the lifting of the corner lift and carry bar.

This type of conveying can be useful for any part that can be transferred on a lift and carry conveyor. It can also be useful for non-accumulating types of conveyors in that nests may be formed upon the frame members of the three lift and carry sections to ensure that the parts are adequately separated as they are conveyed along the path. Also, the upstream lift and carry bar may have an indented portion near the corner section so that it will not interfere with the movement of the corner lift and carry bar.

These and other objects and features of the present invention can be best understood from the following specification and appended drawings of which the following is a brief description thereof.

DETAILED DESCRIPTION OF A PREFERRED EMBODIMENT

Figure 1:
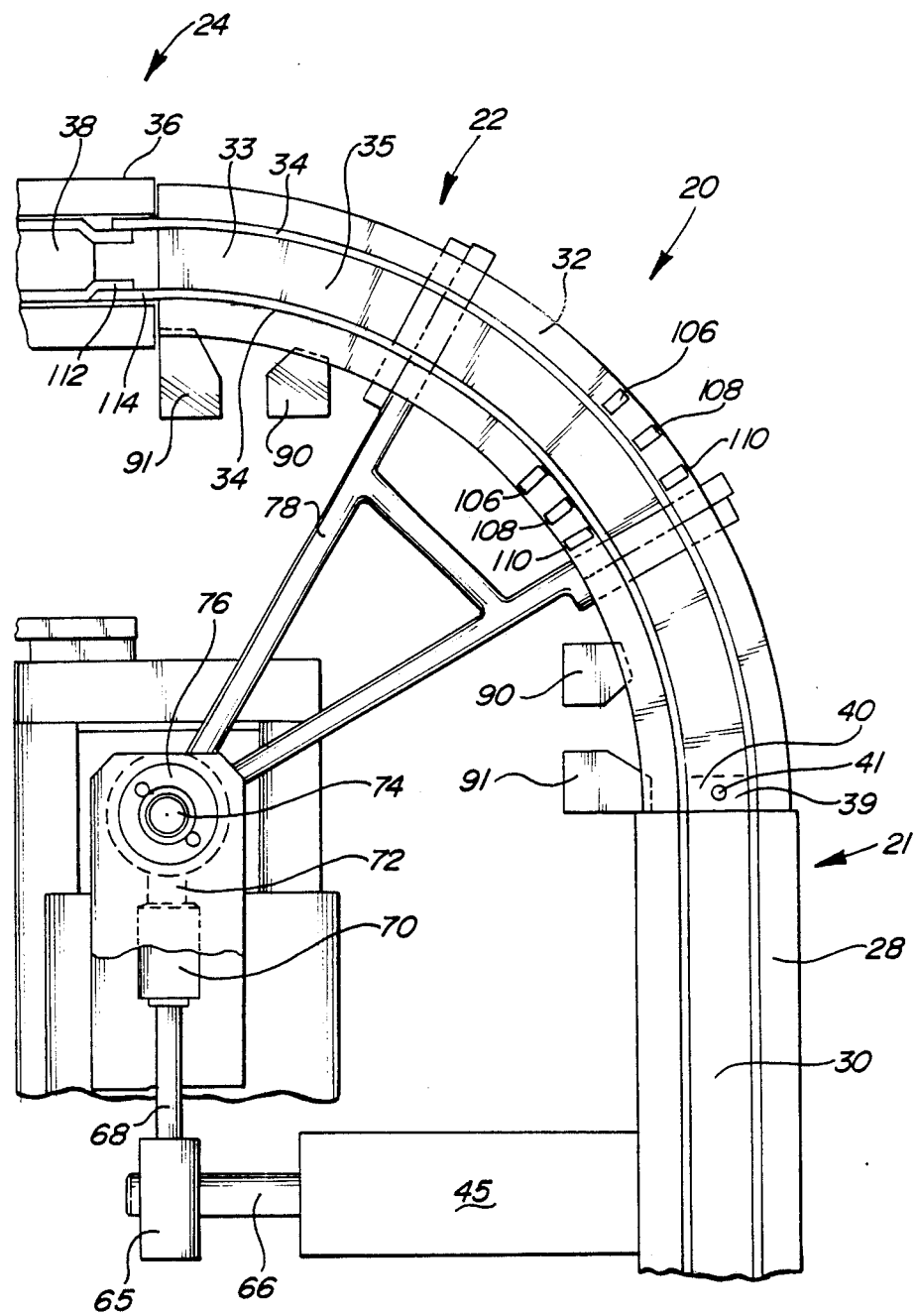
FIG. 1 is a top view showing the serial arrangement of the three conveyor sections of the present invention.

As can be seen in FIG. 1, a conveyor assembly 20 consists of a first straight section 21, a corner or turn section 22, and a second straight section 24. The first straight section could also be called a downstream section, and the second straight section could also be called an upstream section. Each of these three conveyor sections are of the lift and carry, or walking beam type conveyors. The two straight sections extend along axes that are skew with respect to each other and the corner section connects the two.

Downstream lift and carry section 21 consists of a frame section 28 and a first section lift and carry bar 30. Corner lift and carry section 22 consists of a corner frame section 32 and a corner lift and carry bar 33. The corner lift and carry bar has two vertically upstanding sides 34 and a connecting bottom section 35. The straight lift and carry bars have similar configurations. Upstream straight lift and carry section 24 consists of frame section 36 and a lift and carry bar 38.

A ball joint connection 39 connects the downstream straight lift and carry bar 30 to the corner lift and carry bar 33 in such a way that it will allow relative movement between the two vertical, horizontal and rotational directions. A portion 40 of downstream lift and carry bar 30 underlies corner lift and carry bar 33. Ball joint 39 is received in a slot 41 in corner lift and carry bar 33. The resulting connection is much like that commonly used on a vehicle trailer hitch.

Figure 2:
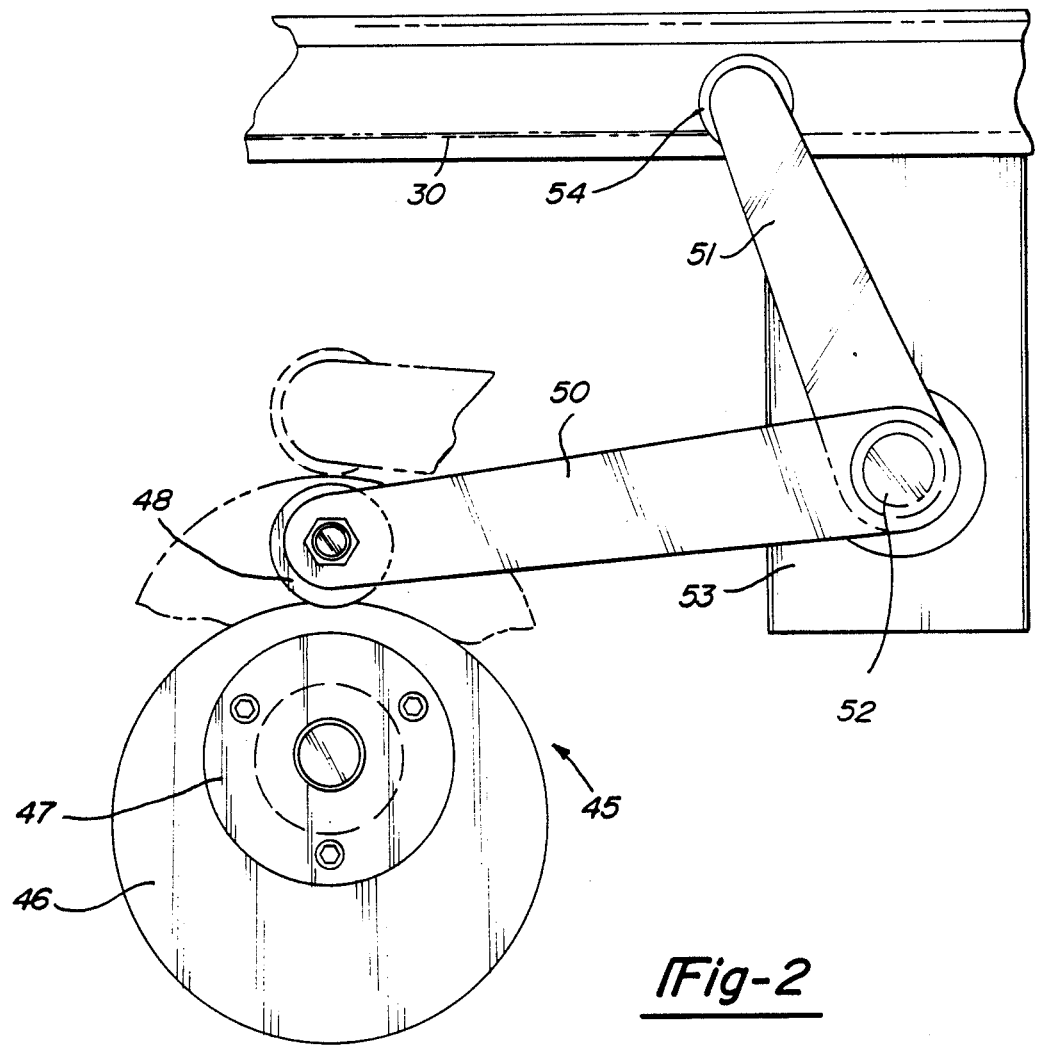
FIG. 2 shows a drive mechanism for lifting a straight lift and carry bar.
Figure 3:
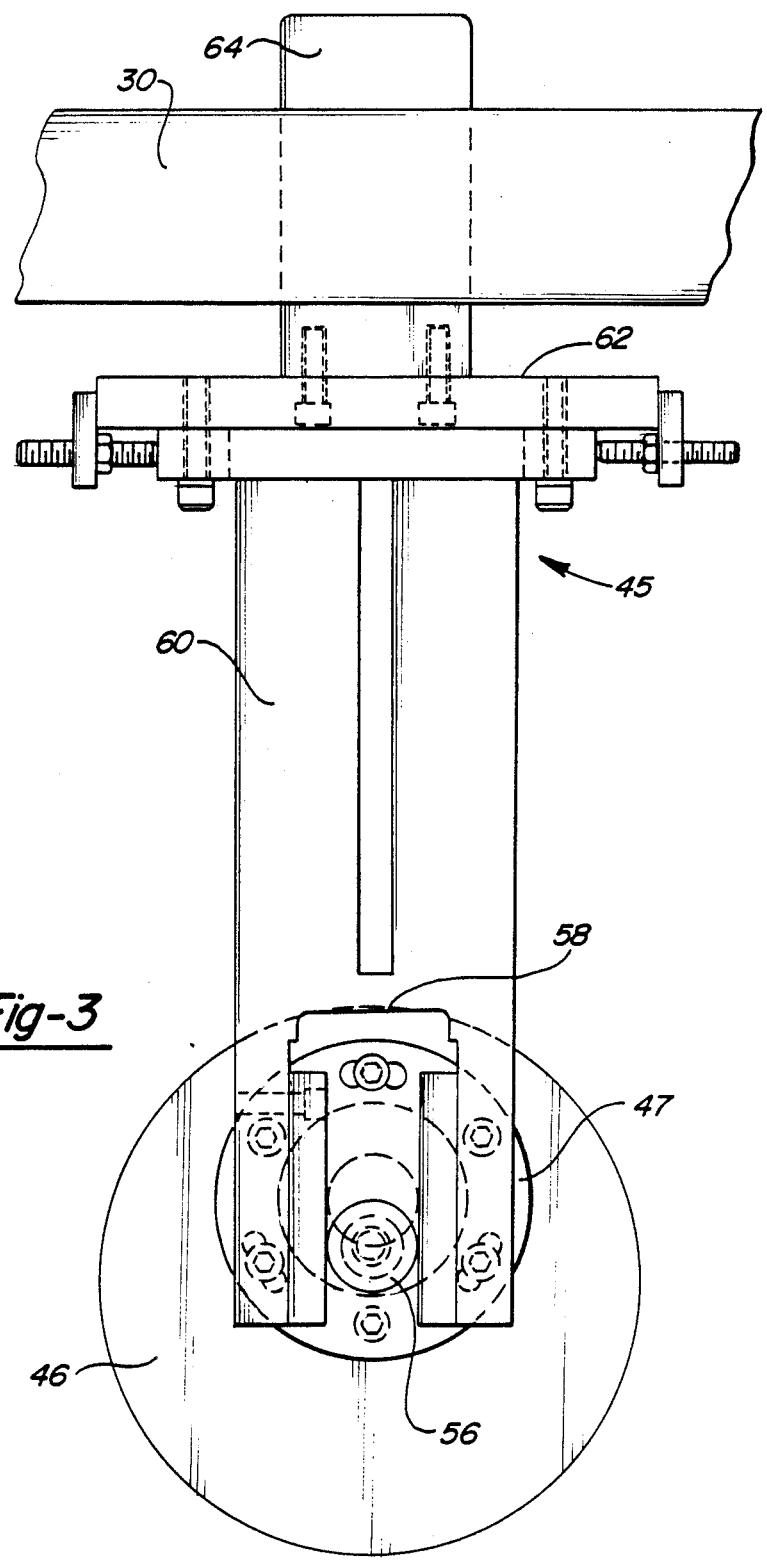
FIG. 3 shows a drive mechanism for driving the straight lift and carry sections along the conveyor path.

The drive of the straight lift and carry sections can be best understood from FIGS. 2 and 3. As shown in FIG. 2, downstream straight lift and carry section 21 has drive 45 that consists of an eccentric 46, a rotating shaft 47 driving the eccentric 46, and a roller cam 48 mounted upon the outer periphery of eccentric 46. Roller cam 48 is connected to a cam link 50 which is fixed to a second cam link 51 at pin 52. A frame section 53 receives the pin 52. Cam link 51 is in turn pivoted at 54 to lift and carry bar 30. As the eccentric 46 rotates with shaft 47, roller cam 48 and cam link 50 are moved vertically upwardly and downwardly, and cam link 51 will be driven forwardly and rearwardly to oscillate lift and carry bar 30 along a prescribed conveyor path. As shown in FIG. 2, member 30 will be driven to the right and then returned to the left by this cam linkage.

As shown in FIG. 3, a bell crank 56 is eccentrically mounted to shaft 47 and will periodically contact an abutment surface 58 of lift member 60 to vertically raise the lift member 60. A lift surface 62 is formed upon lift member 60 and will abut lift and carry bar 30 and move it vertically upwardly. As the eccentric rotates, the bell crank 56 will periodically abut surface 58, raise lift member 60, which in turn abuts lift and carry bar 30 to move it vertically upwardly. A guide extension 64 of lift member 60 ensures that lift member 60 is always positioned properly with respect to lift and carry bar 30.

Now the operation of the lift and carry drive 45 of the downstream straight lift and carry section 21 can be understood from FIGS. 2 and 3. As the bell crank 56 is rotated along with shaft 47, it will periodically cause lift member 60 to be moved vertically upwardly and will bring lift and carry bar 30 upwardly along therewith. Lift and carry bar 30 is normally received vertically below frame 28 and is moved vertically upwardly and above frame 28 by lift member 60. Once the lift and carry bar 30 has been moved vertically above the frame 28, the eccentric 46 will be in a position to move roller cam 48 and cam link 50 upwardly and the cam link 51 will cause the lift and carry bar 30 to be moved along the prescribed conveyor path to move any parts along therewith. Once bar 30 has been moved along the path, the bell crank 56 will be returned to its lowermost position, the lift member 60 will be brought vertically back downwardly, and the cam linkage 50, 51 will return lift and carry member 30 back to its original position within the frame 28. The timing of bell crank 56 and eccentric 46 is such that bar 30 is lifted, moved, and then lowered.

Now with reference to FIGS. 1 and 4, the operation of the corner lift and carry section 22 will be described. A shaft extension 66 rotates along with shaft 47 and has a rocker arm 65 mounted upon it. The extension 66 is slightly eccentric with respect to shaft 47. Rocker arm 65 is allowed to rotate with respect to shaft extension 66 and will rock, or occilate, about a small arc due to the eccentricity between the shaft and the extension. Turnbuckle 67 is pivotally pinned 68 to rocker arm 65 at one end and is pivotally pinned 69 to a slide 70 at its opposite end. Slide 70 is slidably mounted upon a fixed base 71. A second turnbuckle 72 is pivotally pinned 73 to slide 70 and is pivotally pinned 75 to lift post 74 at its opposite end. Lift post 74 is received within a post mount 76 that forms part of the corner lift and carry frame section 32. A pivot bracket 78, having a cylindrical guide portion 79, is rotationally received upon lift post 74.

Figure 4:
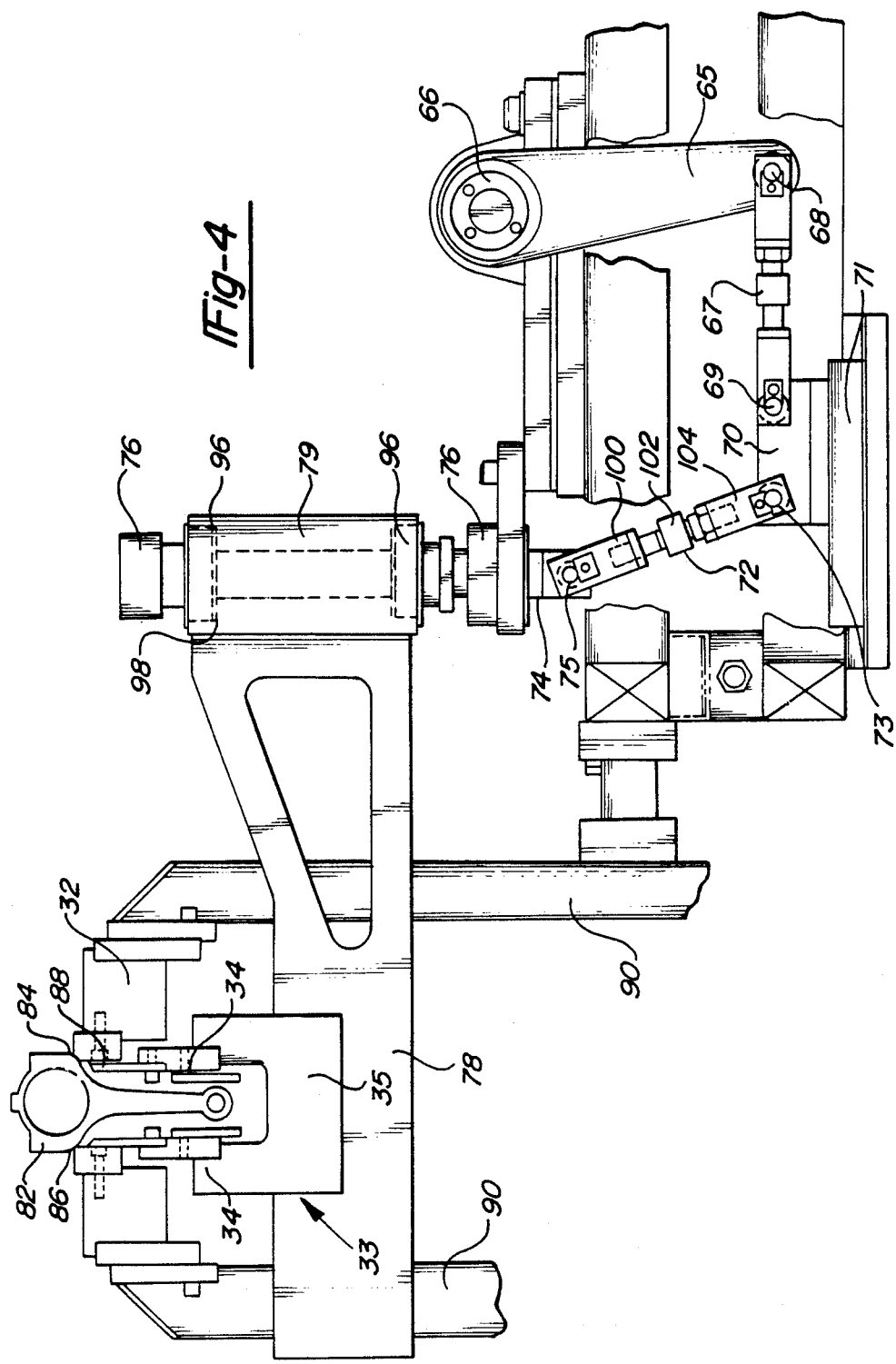
FIG. 4 is a view, partially in cross-section, showing the connection of the drive of the downstream lift and carry section to the corner lift and carry section.

As can be seen in FIG. 4, part 82 has surface 86 that rests upon a frame part support surface 84 that is part of corner frame section 32. A lift and carry surface 88 forming part of the corner lift and carry bar 33 is illustrated vertically below the frame part support surface 84. A support 90 can be seen as supporting the frame portion 32. A clearance between successive supports 90 will allow pivot bracket 78 to pivot through a predetermined angle within the space between two consecutive supports 90. In addition, there is clearance within the overall frame 32 that will allow the pivot bracket 78 to move a small vertical extent sufficient to allow lift and carry surface 88 to be moved vertically upwardly out of frame 32. Posts 91, FIG. 1, define the ends of corner frame 32.

Lift post 74 has bearing surfaces 96 that correspond to bearing surfaces 98 in guide portion 79 of pivot bracket 78. These bearing surfaces 96, 98 allow the pivot bracket 78 to pivot with respect to lift bar 74. At the same time, these bearings will cause pivot bracket 78 to move vertically along with lift post 74 when it is lifted or moved downwardly.

As can be understood from FIG. 4, as rocker arm 65 rocks, it will move turnbuckle 67 along rearwardly and forwardly and the turnbuckle 67 will bring slide 70 along with it. As slide 70 is moved rearwardly and forwardly, it forces second turnbuckle 72 to raise and lower lift post 74. Thus, the rocking movement of rocker arm 65, which is tied into the timing of downstream lift and carry drive 45, will control the upward movement of the lift post 74, the associated pivot bracket 78, and the corner lift and carry bar 33.

The lift and carry drive 45 will also drive downstream lift and carry bar 30 to be moved along its conveyed direction, and the downstream lift and carry bar 30 will pivot the corner lift and carry bar 33 about lift post 74 and move any parts that are mounted upon it through the predetermined angle.

The timing is selected such that lift bar 74 will first move vertically upwardly, bringing bracket 78 and corner lift and carry bar 33 upwardly to lift any parts 82 that are resting on the frame 32. This lifting will be roughly at the same time that bar 30 is lifted. Bar 30 will then be moved and will pivot corner lift and carry bar 33.

It is to be understood that the extent of the arc of the corner lift and carry section can be determined to match any necessary turn situation faced in any conveyor environment.

The turnbuckles 67 and 72 can each be adjusted to vary the amount of relative movement between the eccentric shaft extension 66, the slide member 70, and the lift post 74. Both turnbuckles have a first pinned portion 100, a central threaded portion 102 and a second pinned portion 104. The first and second pinned portions have screw threads that may be adjusted upon threads in the central member 102 to vary the overall length of the turnbuckle and thus change the amount of relative movement between the various parts 65, 70, 74.

Nests 106, 108, 110 may optionally be disposed on the frames of the various sections. These nests will ensure that parts will remain separated while being conveyed. A part is received between nests 106 and 108 and a second part is received between nests 108 and 110 thus insuring the parts remain separated. These nests could extend over the entire conveyor assembly 20. If the conveyor assembly is an accumulator conveyor, it is not necessary to use nests near the end of the downstream section.

Indented ends 112 are formed on lift and carry bar 38 of upstream lift and carry section 24. Indented section 112 will allow bar 38 to move forwardly and into the space between extension ends 114 of corner lift and carry bar 33. Ends 112 can deliver parts to a position that will be reached by ends 114 thus allowing the corner section to take over conveying the parts. Since ends 112 are indented, they will not interfere with ends 114 should they be in the same position at the same time.

A preferred embodiment of the present invention has been disclosed, however, further modifications of the invention may be made without departing from the spirit and the scope of the invention, which can be better understood when considered in light of the appended claims.

What is claimed is:

1. A conveyor for moving parts comprising:
   a first straight lift and carry conveyor section extending along a first axis and having a frame, a lift and carry bar being received in said frame and periodically being lifted vertically above and out of said frame and driven at a vertical position above said frame in a first direction along said first axis;
   a second straight lift and carry conveyor section extending along a second axis, said second axis being skew with respect to said first axis by a first angle, said second straight lift and carry section having a frame, a lift and carry bar being received in said frame and periodically being lifted vertically above and out of said frame and driven at a vertical position above said frame in a second direction along said second axis;
   a corner lift and carry section having a frame, a lift and carry bar being received within said frame, said corner lift and carry bar extending along an arc equal to said first angle and being driven to pivot about an axis, said corner lift and carry bar periodically being lifted vertically above and out of said frame and driven to pivot about said pivot axis, said corner lift and carry section being positioned between said first and second straight lift and carry sections, said arc extending between and connecting said first and second axes;
   wherein said first straight lift and carry section having a drive causing said first lift and carry bar to be periodically lifted and driven in a first direction along said first axis, said first lift and carry section drive consisting at least of a rotating shaft operably connected to cause said corner lift and carry bar to be periodically lifted vertically above and out of said corner frame such that a part may be conveyed along said first lift and carry section, be transferred to said corner lift and carry section, be turned through said arc on said corner lift and carry section and be transferred to said second lift and carry section; and wherein said operable connection includes an eccentric shaft extension with a rocker arm mounted thereon for relative rotational movement therewith, said rocker arm being caused to rock about a small angular extent due to rotation of said eccentric shaft extension, said rocker arm being connected to cause a lift post to be periodically moved vertically upwardly and downwardly, said lift post being rotatably received within a bracket member, said bracket member being fixed to said corner lift and carry bar, alternate movement vertically upwardly and downwardly of said lift post causing said bracket member and said corner lift and carry bar to be moved vertically upwardly along therewith.

2. A conveyor as recited in claim 1, and further wherein said rocker arm is pinned to a turnbuckle which is in turn pinned to a slide member that is slidably received upon a base, said slide member being pinned to a second turnbuckle which is in turn pinned to said lift post.

3. A conveyor as recited in claim 2, and further wherein both said first and second turnbuckles are of adjustable length.

4. A conveyor as recited in claim 2, and further wherein said lift post has a bearing surface, said bracket member having a cylindrical support section formed therewith and receiving said lift post at a central portion thereof, said bearing surface of said lift post being received within bearing openings within said cylindrical support section to provide adequate bearing surface for relative rotation of said bracket with respect to said lift post.

5. A conveyor as recited in claim 3 and wherein one of said first and second straight lift and carry bars has indented ends that interfit with associated ends of said corner lift and carry bar.

6. A conveyor as recited in claim 3 and wherein nests are formed on said corner frame to separate parts.

7. A conveyor as recited in claim 3, and wherein said conveyor defines a path for moving parts, said first straight lift and carry section being downstream in said path from said corner section, said second straight lift and carry section being upstream in said path from said corner lift and carry section, said corner lift and carry bar being connected to said first straight lift and carry bar such that said first straight lift and carry bar drives said corner lift and carry bar about said pivot axis, said connection between said first straight lift and carry bar and said corner lift and carry bar consisting of a ball joint received in a slot.

8. A conveyor as recited in claim 6, and wherein said conveyor defines a path for moving parts, said first straight lift and carry section being downstream in said path from said corner section, said second straight lift and carry section being upstream in said path from said corner lift and carry section, said corner lift and carry bar being connected to said first straight lift and carry member such that said straight lift and carry bar drives said corner lift and carry bar about said pivot axis.

9. A conveyor as recited in claim 8, and wherein said connection between said corner lift and carry bar and said first straight lift and carry bar allows relative movement between the two vertical, horizontal and rotational directions.

* * * * *

UNITED STATES PATENT AND TRADEMARK OFFICE
CERTIFICATE OF CORRECTION

PATENT NO. : 4,951,804

DATED : August 28, 1990

INVENTOR(S) : Charles E. McCulloch, Michael Peabody

It is certified that error appears in the above-identified patent and that said Letters Patent is hereby corrected as shown below:

In column 8, claim 5, line 1, please delete "3" and add --1--; in claim 6, line 1, please delete "3" and add --1--; in claim 7, line 1, please delete "3" and add --1--; and in claim 8, line 1, delete "6", and add --1--.

Signed and Sealed this

Twenty-seventh Day of October, 1992

Attest:

DOUGLAS B. COMER

*Attesting Officer*  *Acting Commissioner of Patents and Trademarks*